H. Vansands.

Shutter Fastener.

No. 3,392. Reissued Apr. 20, 1869.

N. PETERS, PHOTO-LITHOGRAPHER, WASHINGTON, D. C.

United States Patent Office.

RANDOLPH HAYDEN AND JAMES C. FERREE, OF MIDDLETOWN, CONNECTICUT, ASSIGNEES OF HORACE VANSANDS, OF SAME PLACE.

*Letters Patent No.* 17,243, *dated May* 5, 1857; *reissue No.* 3,392, *dated April* 20, 1869.

IMPROVED BLIND-FASTENING.

The Schedule referred to in these Letters Patent and making part of the same.

*To all whom it may concern:*

Be it known that we, RANDOLPH HAYDEN and JAMES C. FERREE, of Middletown, county of Middlesex, and State of Connecticut, are owners or assignees of HORACE VANSANDS' new and useful Improvement in Window-Blind or Shutter-Fastening; and to enable others skilled in the art to make and use the same, we will proceed to describe its construction by referring to the drawings, in which the same letters indicate like parts in each of the figures.

A is the hook.

B is the rivet or small screw by which the hook is held in place, having a spring coiled round the same, and whereby the two parts of the shell or case are united together to form the shell or case and completes a screw.

C is the slot in the larger or outer end of the shell or case.

D is the slot in the smaller end of the shell or case which first enters the hole prepared therefor.

The different parts of the fastening are made of iron or any other suitable metal. The shell or case is cast in two parts with its screw-threads on the convex surface, the upper side of each part being concave, so that when the parts are united with the hook inserted, as shown in fig. 1, the hook will play back and forth in the slots C and D, the respective lengths of which will vary according to the size of the hook and shell and the length of play required.

Figure 4:
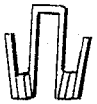
Figure 4 represents the spring.

The spring, fig. 4, serves to direct the motion of the hook and to retain it in place.

Figure 2:
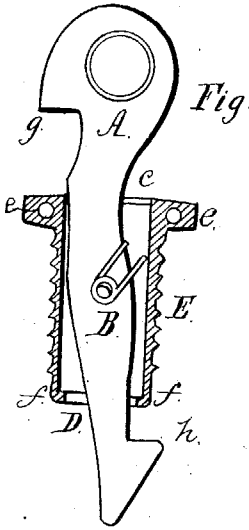
Figure 2 represents one half of the shell or case with the hook and the spring and its screw-threads.

The points *e e* and *f f*, or their equivalents in the half of the shell, fig. 2, are let into corresponding holes in the other part of the shell, so as to keep the parts firm when united by means of the rivet or small screw B; but they are not deemed absolutely necessary in order to secure the perfect working of the device, because when screwed into the blind, they will be brought to their proper place by the act of so doing.

Figure 1:
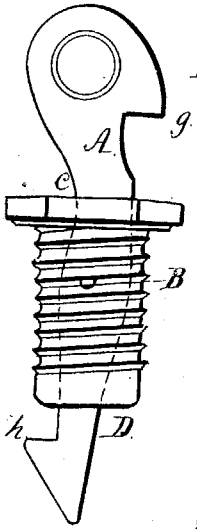
Figure 1 represents the fastening complete and ready for application.
Figure 5:
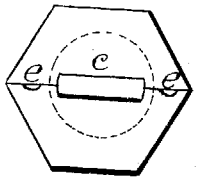
Figure 5 represents the larger or outer end of the case or shell.
Figure 3:
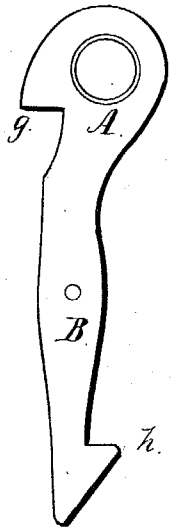
Figure 3 represents the hook.

The fastening thus completed, as shown in fig. 1, is applied to the blind or shutter by boring a hole therein, and forcing the fastening into the hole by means of a wrench, so that the screw part of the shell shall be within, and the respective ends of the shell without the shutter or blind.

We do not deem it necessary to form the head six or eight square, because a neat round flange will give a better external finish, and the case can be easily turned into the hole in the blind by means of the extended portion of the hook. We do not therefore wish to be confined to a nut formation for the purpose of turning this device into a hole or socket prepared therefor.

The fastening being thus fixed horizontally to the shutter or blind, keeps the same in place when shut by the part of the hook *g* passing round a staple in the sill of the window, and also keeps the shutter or blind in place when open by the part of the hook *h* passing round and holding to a suitable catch inserted in the building.

What we claim, and desire to secure by Letters Patent, is—

1. The two-part case, having a screw surface in combination with the hook A, as a new and useful improvement in the manufacture of blind or shutter-fastenings, substantially as described.

2. The recess or slots C D, formed in a two-part shell of a blind or shutter-fastener case, substantially as and for the purpose described.

3. In a blind or shutter-fastener, a two-part cylindrical case, in combination with an actuating spring and hook, A, substantially as and for the purpose described.

4. In a blind or shutter-fastener, a cylindrical case, in combination with a hook fastening which oscillates upon an axis pin, with an actuating spring.

RANDOLPH HAYDEN. [L. S.]
JAMES C. FERREE. [L. S.]

Witnesses:
E. W. BLISS,
J. W. BLISS.